United States Patent
Braeuer et al.

(10) Patent No.: US 7,080,818 B2
(45) Date of Patent: Jul. 25, 2006

(54) PRESSURE REGULATING VALVE FOR COMMON-RAIL FUEL INJECTION SYSTEM

(75) Inventors: Christian Braeuer, Steyr (AT); Stefan Holl, Dresden (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/940,971

(22) Filed: Sep. 15, 2004

(65) Prior Publication Data

US 2005/0056801 A1 Mar. 17, 2005

(30) Foreign Application Priority Data

Sep. 15, 2003 (DE) ................................ 103 42 486

(51) Int. Cl.
*F16K 31/08* (2006.01)
(52) U.S. Cl. ........................................ 251/65; 335/302
(58) Field of Classification Search ................. 251/65, 251/129.15; 335/302
See application file for complete search history.

(56) References Cited

U.S. PATENT DOCUMENTS 5,188,336 A * 2/1993 Graner et al. .......... 251/129.16
6,386,505 B1 * 5/2002 Schob ........................... 251/7

* cited by examiner

*Primary Examiner*—Edward K. Look
*Assistant Examiner*—John K. Fristoe, Jr.
(74) *Attorney, Agent, or Firm*—Ronald E. Greigg

(57) ABSTRACT

A pressure regulating valve, for regulating the pressure in a common rail, having a pistonlike valve member guided axially displaceably in a bore, which valve member acts on a closing element which can be pressed against a valve seat, and the valve member forms an armature of an electromagnet that can be supplied with current. The armature of the electromagnet is embodied as a permanent magnet, or the electromagnet surrounding the armature is connected to a permanent magnet likewise acting on the armature, so that even in the state without current, a magnetic force acts on the valve member. In this way, even in the event of a failure of the electromagnetic regulation, a pressure is generated at the valve outlet. In the state when current is supplied, the closing force of the valve can be regulated over the entire pressure range.

2 Claims, 1 Drawing Sheet

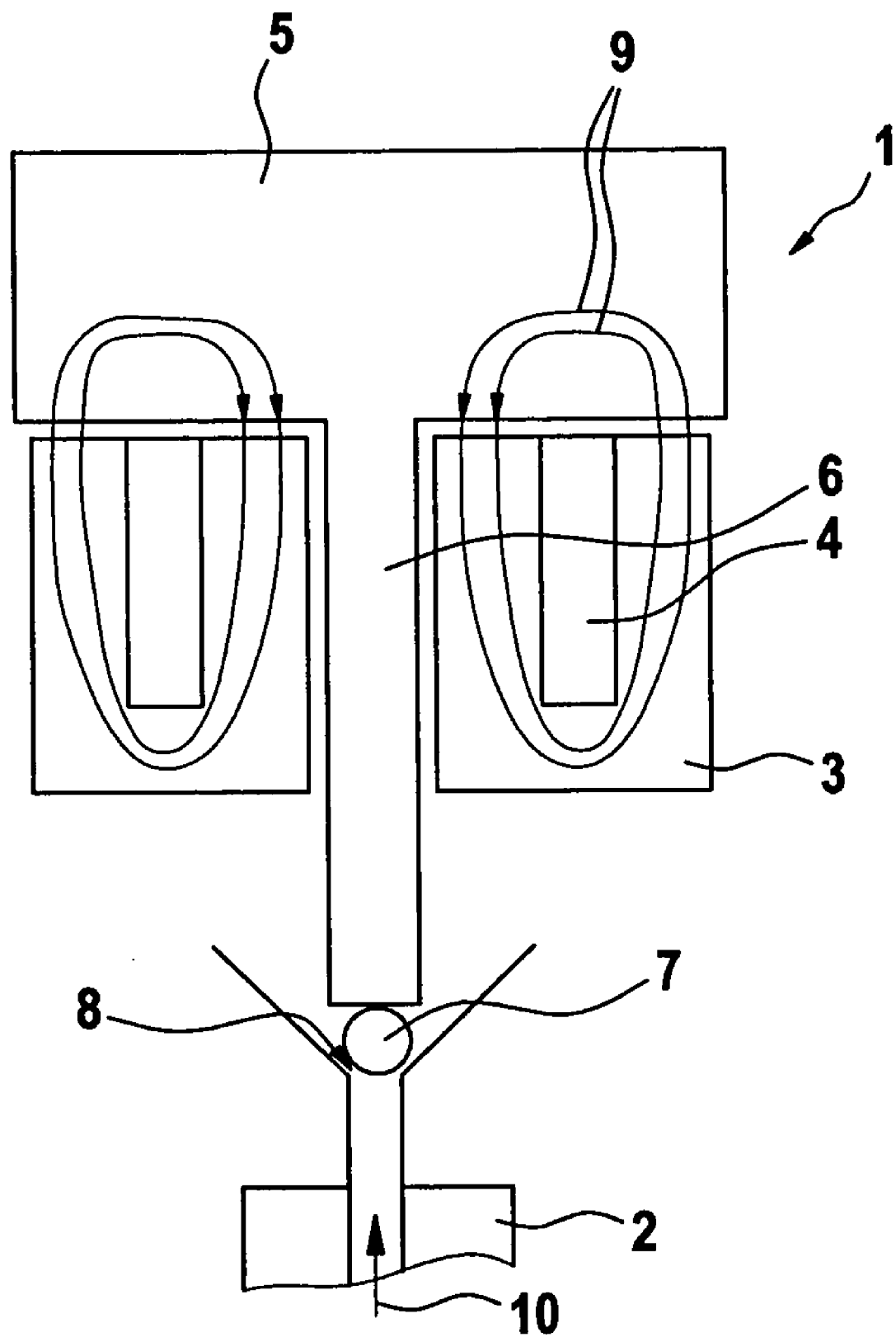

PRESSURE REGULATING VALVE FOR COMMON-RAIL FUEL INJECTION SYSTEM

BACKGROUND OF THE INVENTION

1. Field of the Invention

The invention relates to a pressure regulating valve for a common-rail fuel injection system for internal combustion engines, for regulating the pressure in the common rail and having a pistonlike valve member guided axially displaceably in a bore, which valve member acts on a closing element which can be pressed against a valve seat, and the valve member forms an armature of an electromagnet that can be supplied with current. Electromagnets with movable armatures are furthermore used as actuators in many kinds of applications.

2. Description of the Prior Art

Pressure regulating valves are known in manifold versions, including pressure regulating valves serving to regulate the pressure in a common rail, with which it communicates via an inlet. The pressure regulating valve has a pistonlike valve member, guided axially displaceably in a bore, that can move counter to a force which is exerted on the valve member preferably by the current in the electromagnet. The force acts in the closing direction, so that the valve member presses against a closing element of the pressure regulating valve and is pressed against a valve seat. The valve member forms an armature of an electromagnet, which can be supplied with current for controlling the force.

Supplying current via the valve member causes the closing element to press against the valve seat with a defined force, and the closing element is lifted from the valve seat by the pressure in the common rail acting on it, if the force generated by the pressure exceeds the closing force that is exerted on the closing element via the valve member. In that case, fuel flows out of the common rail through the inlet into a relief chamber via the opened pressure regulating valve.

When a higher pressure is to be established in the common rail, the current in the electromagnet is increased, so that the closing force is increased, and thus the closing element does not lift from the valve seat until a higher pressure is established in the common rail, whereupon fuel can flow out of the common rail into the relief chamber.

If no current is supplied to the electromagnet, the valve member is pressed against the valve seat only by its own weight. Moreover, a mechanical spring can be installed, which with its spring force presses the valve member against the closing element and the valve seat. This force is independent of the current supply to the electromagnet.

If a functional problem in supplying current occurs in the electromagnet, for instance from loosening of the corresponding plug, causing a failure of the electromagnetic closing force, then fuel at low pressure can penetrate the relief chamber and make an injection impossible. In that case the vehicle can no longer be driven.

If an additional pressure is generated by means of a mechanical spring, then emergency travel is indeed possible, but the spring force acting on the valve member cannot be regulated.

OBJECT AND SUMMARY OF THE INVENTION

It is the object of the invention to refine the pressure regulating valve known from the prior art in such a way that on the one hand even if the power supply fails it generates a sufficiently high pressure at the valve outlet and thus makes unregulated emergency travel possible, while on the other hand regulation is possible over the entire pressure range when current is supplied.

The design of the pressure regulating valve makes an injection possible even without current regulation of the pressure regulating valve and thus also enables emergency travel as well as regulation of the pressure over the entire pressure range.

As a result of the pressure in the common rail, a force is exerted on the valve member of the pressure regulating valve. If this force generated by the hydraulic pressure is greater than the force acting on the valve member in the closing direction, the valve member lifts from the valve seat and opens the pressure regulating valve. Even when current is not being supplied to the electromagnet, a magnetic force is operative that presses the valve member against the closing element and the valve seat.

This force is generated either by providing that the armature itself is a permanent magnet, or by providing that the armature is located in a magnetic field generated by a permanent magnet.

The magnetization of the permanent magnet can be designed such that the magnetic force and hence the closing pressure as well are high enough to build up a sufficiently high pressure in the common rail to enable an injection event.

Regulating the injection pressure is done independently of this, by way of the current supply to the electromagnet. For that purpose, the electromagnet is adjusted such that upon a current increase, depending on the polarization, a magnetic force acts in the direction of the hydraulic force, or in other words the closing force of the valve is reduced, or a magnetic force in the closing direction is generated.

The closing pressure of the valve can thus be regulated over the entire pressure spectrum.

If the pressure interval to be regulated is predetermined, then by comparison with a conventional pressure regulating valve, the magnetic force generated by the control current has to cover only a narrower pressure range. Lower control currents are thus necessary, so that the heat input into the system is also less.

This is especially useful in those ranges in which a high pressure is exerted on the valve. In that case, the expanding fuel likewise flows at high pressure through the valve and assures a high heat input. In a limit situation, the magnetization of the permanent magnet can be selected such that the maximum closing pressures are generated without additionally supplying current; supplying current is then necessary only for regulating the lower pressures at which the heat input by the fuel is less.

At high fuel pressures and with a correspondingly high heat input, the closing pressure need not be reinforced by a supply of current to the electromagnet; there is therefore no heat input as a result of the current flow in the coil of the electromagnet. Such a heat input occurs only if the pressure generated by the permanent magnet is to be reduced, but in that case the fuel flows at a lower pressure and transfers correspondingly less heat.

The heat input from supplying current to the electromagnet can accordingly be advantageously adapted to the heat input by the fuel, which reduces the overall thermal load on the valve.

Since if a permanent magnet is present, only pressure differences have to be regulated by the electromagnet, the electromagnet can be designed as smaller than that in a conventional pressure regulating valve. This means for instance that a coil with fewer windings can be used, which under some circumstances leads to a reduction in the overall structural size.

In a limit situation, half of the required maximum closing pressure is generated by the permanent magnet. In that case, compared to a conventional pressure regulating valve, the electromagnet needs to supply only half the closing force. By a reversal of the current direction, the pressure generated by the permanent magnet is reduced, and thus the pressure can be regulated over the entire pressure interval from the least to the maximum closing pressure.

BRIEF DESCRIPTION OF THE DRAWING

The invention will be better understood and further objects and advantages thereof will become more apparent from the ensuing detailed description of a preferred embodiment taken in conjunction with the single drawing FIGURE which shows a section through a schematic illustration of a pressure regulating valve according to the invention.

DESCRIPTION OF THE PREFERRED EMBODIMENT

In FIG. 1, a longitudinal section is shown through a schematic view of a pressure regulating valve 1 which can be disposed on a common rail 2.

The pressure regulating valve 1 itself has a valve body, not identified by reference numeral, in which an electromagnet 3 with a coil winding 4 is disposed. The coil is embedded in soft magnetic material, such as transformer sheet metal.

The armature 5 of the electromagnet 3 is located in an axial recess and can simultaneously be pressed as a valve member 6 against the closing element 7 and the valve seat 8. The armature 5 is embodied as a permanent magnet, so that even without current being supplied to the coil 4, magnetic flux lines 9 extend through the electromagnet 3 and assure a force of the valve member 6 in the direction of the closing element 7 and the valve seat 8.

Supplying current to the electromagnet 3 effects a magnetic force either in the direction of the hydraulic force 10 or, if the current direction in the coil 4 is reversed, in the opposite direction. If the regulating current is increased, then depending on the current direction, the valve member 6 is pressed more or less strongly against the closing element 7 and against the valve seat 8.

The foregoing relates to a preferred exemplary embodiment of the invention, it being understood that other variants and embodiments thereof are possible within the spirit and scope of the invention, the latter being defined by the appended claims.

We claim:

1. In a pressure regulating valve for a common-rail fuel injection system for internal combustion engines for regulating the pressure in the common rail, having a pistonlike valve member guided axially displaceably in a bore, which valve member acts on a closing element which can be pressed against a valve seat, the valve member forming an armature of an electromagnet that can be supplied with current, the improvement wherein the armature (5) of the electromagnet (3) is embodied as a permanent magnet, whereby even in the state without current, a magnetic force acts on the valve member (6), wherein the magnetic force of the permanent magnet is designed such that the permanent magnet generates the closing pressure for the maximum desired pressure in the common rail (2), whereby supplying current to the electromagnet (3) is required only for regulating the lower pressures.

2. In a pressure regulating valve for a common-rail fuel injection system for internal combustion engines for regulating the pressure in the common rail, having a pistonlike valve member guided axially displaceably in a bore, which valve member acts on a closing element which can be pressed against a valve seat, the valve member forming an armature of an electromagnet that can be supplied with current, the improvement wherein the electromagnet (3) surrounds the armature (5) and is associated with a permanent magnet which acts to press the armature (5) against the closing element, whereby even in the state without current, a magnetic force acts on the valve member (6), and wherein the magnetic force of the permanent magnet is designed such that the permanent magnet generates the closing pressure for the maximum desired pressure in the common rail (2), whereby supplying current to the electromagnet (3) is required only for regulating the lower pressures.

* * * * *